Figure 1:
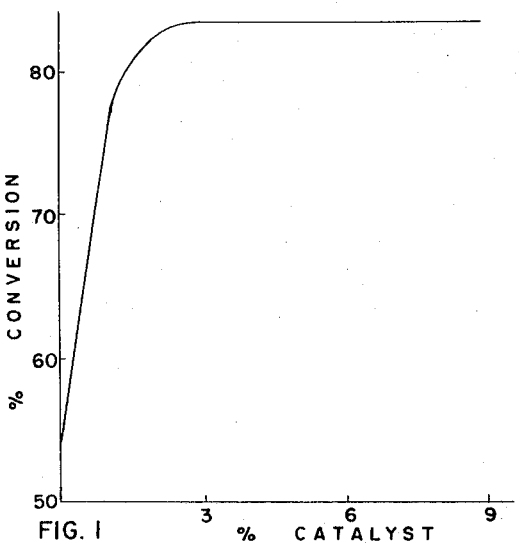

WILLIAM J. GAISER
DALE J. HOHBACH
INVENTORS

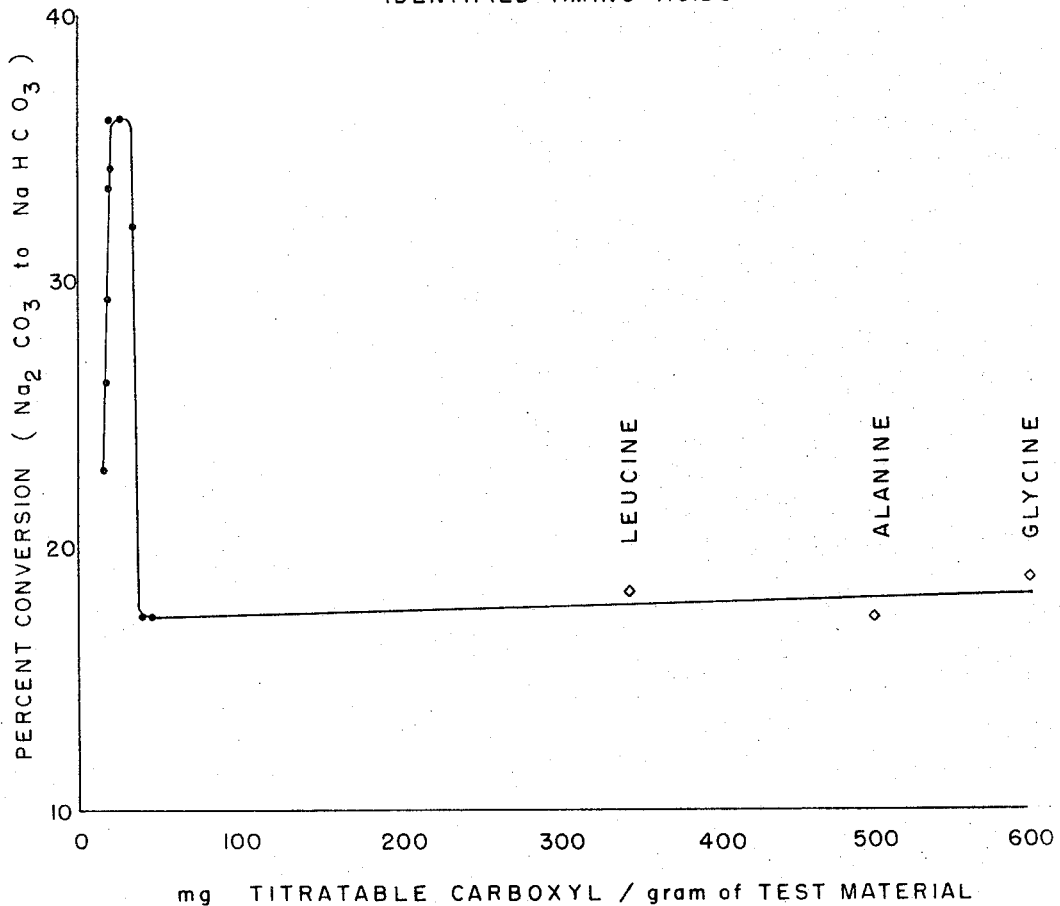
FIG. II
WILLIAM J. GAISER
DALE J. HOHBACH
INVENTORS

United States Patent Office 3,304,151
Patented Feb. 14, 1967

3,304,151
PROCESS OF ABSORBING GASEOUS CARBON DIOXIDE INTO AQUEOUS SOLUTIONS OF INORGANIC ALKALI
William J. Gaiser, Portland, and Dale J. Hohbach, Hillsboro, Oreg., assignors to Pacific Adhesives Company, Inc., Hillsboro, Oreg., a corporation of Oregon
Filed May 28, 1965, Ser. No. 467,161
8 Claims. (Cl. 23—2)

This application is a continuation-in-part of the patent application of William J. Gaiser and Dale J. Hohbach, Serial No. 175,436, filed February 26, 1962 for Acid Gas Absorption Catalyst and Process for Its Manufacture and Use, and now abandoned.

The present invention pertains to processes for the catalytic absorption of carbon dioxide gas into aqueous solutions of inorganic alkali. It relates particularly to the application of blood catalysts in separating carbon dioxide gas from gaseous mixtures in which it is contained, by contacting the mixtures with aqueous solutions of inorganic alkali.

Aqueous solutions of sodium and potassium carbonate have been widely used heretofore as absorbents for carbon dioxide and other acid gases. In such use, the carbon dioxide has been passed through a solution of sodium or potassium carbonate which thereupon is converted to sodium or potassium bicarbonate, removing the carbon dioxide component from the gas. After substantial conversion of the carbonate to bicarbonate, the solution is boiled, regenerating the carbonate for further use.

A serious limitation to the foregoing procedure has been the relatively slow absorption rate of carbon dioxide in the aqueous alkaline solution. In many instances the absorption rate has been so slow as to necessitate absorption of the carbon dioxide in alkaline hydroxide solutions, rather than carbonate solutions, with the resultant necessity of discarding the non-regenerable alkali carbonate product.

It is the general object of the present invention to provide a catalyst, and processes for its manufacture and use, which catalyst will promote the rate of reaction between carbon dioxide gas and aqueous alkaline solutions to such an extent that the normally slow carbonate to bicarbonate reaction will proceed at a rate which is closer to the uncatalyzed hydroxide to carbonate reaction. As a result, the efficiency and capacity of existing carbon dioxide absorption systems is vastly increased, and the application of relatively small size equipment is permitted in new installations.

Figure 9:
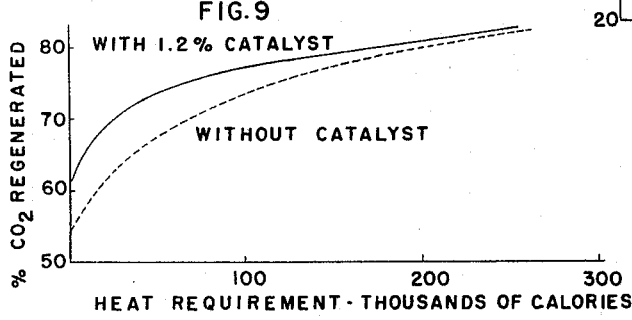
Figure 5:
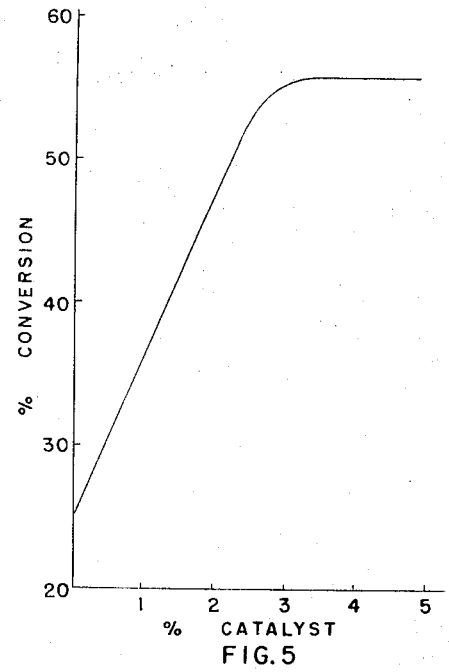
Figure 10:
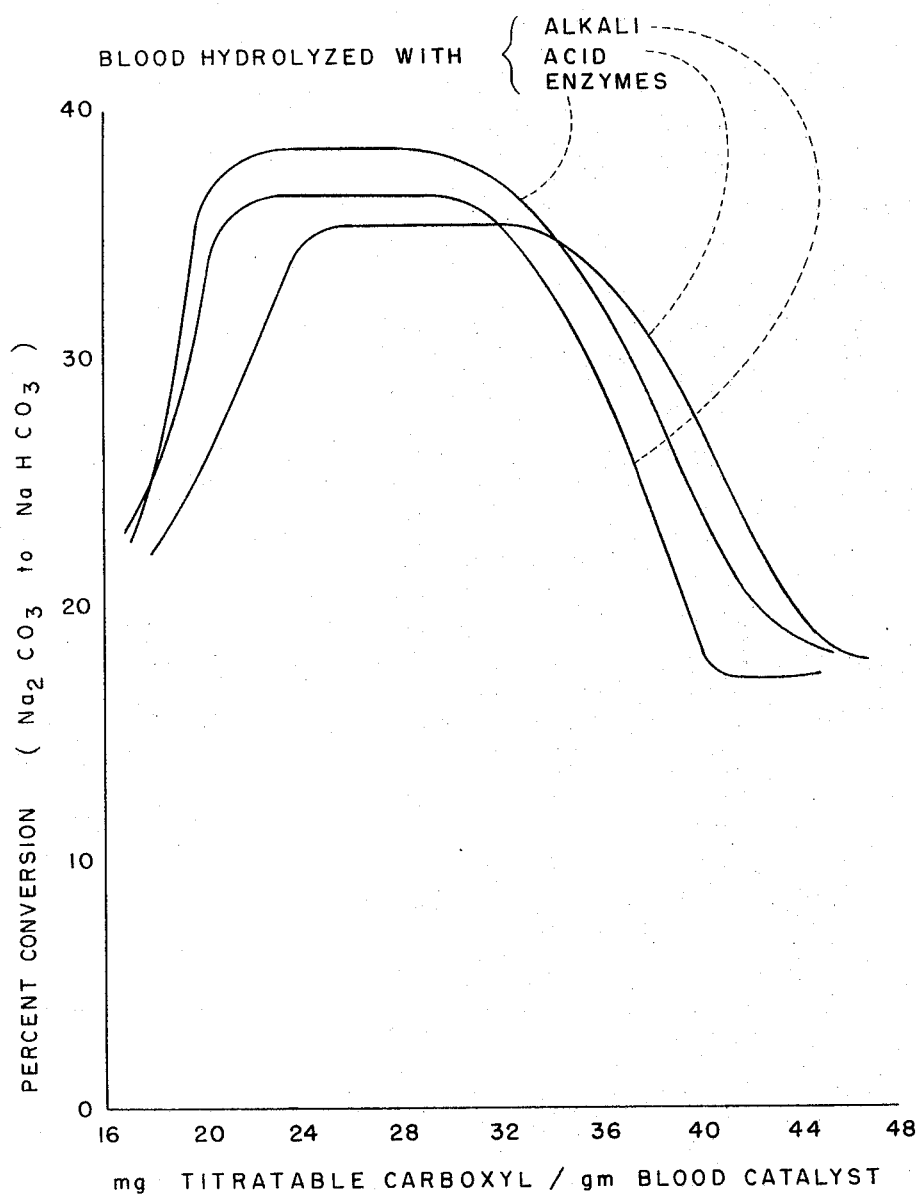

In the drawings:

FIGS. 1–9, inclusive, are graphs illustrating the application of the presently described acid gas absorption catalyst; and FIGS. 10 and 11 are graphs illustrating the relationship between the efficiency of the presently described acid gas absorption catalyst and its content of titratable carboxyl groups.

The catalyst employed in the herein described process for absorbing gaseous carbon dioxide into aqueous solutions of inorganic alkali broadly comprises animal blood which has been hydrolyzed through the action of aqueous alkali, acid, or proteolytic enzymes.

In the preparation of the catalyst, the blood is hydrolyzed to a critical content of from about 20 to 40 milligrams of titratable carboxyl per gram of blood catalyst.

In the application of the catalyst, it is dissolved, together with the sodium carbonate, sodium hydroxide or other selected inorganic alkali material, in the aqueous absorption medium. From 0.25–10.0% by weight of blood catalyst is used, based on the weight of the particular alkaline material employed. The carbon dioxide containing gas then is passed through the solution, whereupon the carbon dioxide is absorbed rapidly, much more rapidly than is the case when the catalyst is absent. The procedure may be carried out continuously if desired, and the resulting solution may be heated for regeneration of the alkaline treating agent.

Considering the foregoing in greater detail:

The blood which is the raw material for the preparation of the herein described catalyst may comprise any of the animal blood products of commerce. Thus it may comprise freshly drawn slaughter house blood, stored liquid blood with or without preliminary declotting and defibrination, spray-dried soluble blood, etc. Considerable latitude is possible in the selection of the blood source since any clots which may be present are dispersed during the subsequent hydrolytic procedure. Also, if the water content of the blood has been removed or altered, suitable compensation may be made by the addition of more water before or during hydrolysis.

It is the fundamental concept of the invention that when animal blood from any of the foregoing sources is hydrolyzed, the blood, which initially is practically non-catalytic with respect to the absorption of carbon dioxide gas in aqueous alkaline solutions, is so altered as to become a very effective catalyst for that process. Apparently during hydrolysis the blood is degraded into materials which serve a catalytic function.

The identities of these materials is not known, but their production is a function of blood protein cleavage. Accordingly it can be measured by the carboxyl content developed during the hydrolysis.

The extent of hydrolysis is critical, however, to the successful preparation of the catalyst. Just as an unhydrolyzed blood is practically non-catalytic, so an over-hydrolyzed blood is relatively ineffective as a catalyst. In fact, as will be shown, the individual amino acids which are the end products of blood hydrolysis have no catalytic effect whatsoever.

Accordingly, it is necessary for the present purpose to carry out the hydrolytic degradation of the blood until a blood carboxyl content of from about 20 to about 40 mg. of titratable carboxyl per gram of blood catalyst has been obtained. If the blood product has less than about 20 mg. titratable carboxyl per gram, it demonstrates catalytic properties in very small degree. If it contains more than about 40 mg. titratable carboxyl per gram, it likewise exhibits little or no catalytic properties. However, between the rather narrow but critical range of from about 20 to 40 mg. titratable carboxyl per gram, the blood catalyst demonstrates a remarkable and surprising increase in its catalytic effect on the absorption of gaseous carbon dioxide into aqueous alkaline media.

In the preparation of the blood catalyst, the blood may be hydrolyzed using either bases, acids, proteolytic enzymes or any other hydrolyzing agents known to the art.

Where an alkaline hydrolysis of the blood is contemplated, the predetermined amount of sodium hydroxide, potassium hydroxide, sodium carbonate, or other alkali is added to the liquid blood or to a water dispersion of blood solids. The resulting mixture then is stirred, preferably with heating, to a temperature level of from 150° F. to its boiling point until the desired degree of hydrolysis has been achieved. The reaction may be carried on under pressure if it is desirable to accelerate the reaction rate. The pH is maintained at a value of at least 9.

If an acid hydrolysis is contemplated, the same procedure is followed except that sufficient sulfuric acid, phosphoric acid, hydrochloric acid, or other acid is employed to effectuate the protein cleavage, the pH being maintained at a level of below 5. Again the reaction may be accelerated by the application of heat, with or without the use of pressure conditions.

In the enzymatic hydrolysis of the blood, the liquid blood or aqueous suspension of blood is subjected to the action of a proteolytic enzyme such as pepsin, trypsin, ficin, bromolain, papain, pancreation, or proteolytic fungal enzymes, available as commercial products or concentrates. The enzyme is dispersed in water and mixed with the liquid blood or aqueous blood suspension. The resulting mixture then is stirred at room temperature or at elevated temperature, but insufficiently elevated to inactivate the enzyme or coagulate the protein, until the desired increase in carboxyl content has been achieved.

Although the hydrolyzed blood products may be used in liquid form, just as it is prepared by the hydrolysis of the raw blood, it is preferred in normal commercial practice to remove its water content so that a solid product is obtained which may be bagged, stored and shipped conveniently.

Accordingly, from 0.001 to 10% by weight, based on the dry blood solids, of sodium dichromate, potassium dichromate, or other preservative, may be mixed into the hydrolyzed blood either before, during or after the hydrolytic reaction. The resulting product then may be dried by suitable methods, preferably by spray drying in conventional spray drying apparatus.

When thus prepared, the catalytic product may be prepared in a central location convenient to a source of blood stored for long periods of time and then used as a catalyst for acid gas absorption. The use of the catalytic product is attended by advantages of the greatest significance. First, it markedly increases the rate of absorption of carbon dioxide in aqueous alkaline media. Second, it markedly increases the total conversion of the alkaline material by the carbon dioxide, for example, the conversion of sodium carbonate to sodium bicarbonate, thus increasing the efficiency of the process. Third, it produces a spent solution which is regeneratable to usable form quickly, efficiently, and with small loss of material. Fourth, it is applicable to the recovery of carbon dioxide from a wide variety of gaseous mixtures.

Examples of its application for this purpose are numerous. It may be used, for example, in systems employed for purifying air in enclosed places from which carbon dioxide is to be removed and to which oxygen is to be added.

Similarly, it is applicable in the large scale in systems used for the removal of carbon from atmospheric air during the manufacture of liquid nitrogen and oxygen by air fractionation techniques. In this application, it is important that the carbon dioxide be removed since, because of its high freezing temperature, it freezes in the lines of the system, clogging them.

Still another important application of the catalyst is in systems employed for scrubbing stack gases, where carbon dioxide is to be removed together with other acid gases such as hydrogen sulfide, sulfur dioxide and carbonyl sulfide. In a related use, it may be employed in systems used for the removal of carbon dioxide from hydroformed gases.

In all of these and other applications, the blood catalyst may be included without material alteration of the system except that apparatus of smaller capacity may be employed, and the contact time may be reduced sharply.

Thus the gas absorption procedure may be carried out batchwise by passing the carbon dioxide-containing gas through a quantity of the selected aqueous alkaline solution contained in a suitable reaction vessel, preferably a packed or tray type column, where effective contact of the phases is provided. If the operating cycle is so prolonged that the blood catalyst is deteriorated by continuing hydrolysis in the alkaline environment of the reaction vessel, make-up catalyst may be added from time to time as required. It is a feature of the invention, however, that the active life of the blood catalyst persists over a period of several days, even despite the adverse reaction conditions under which it is used.

At the conclusion of the reaction, the aqueous alkaline medium may be regenerated in the usual manner. Thus where it comprises a sodium carbonate medium, in which the sodium carbonate is converted to sodium bicarbonate during the absorption reaction, the mixture may simply be heated or boiled, driving off the carbon dioxide, which may be collected if desired, and regenerating the sodium carbonate. The regenerated solution then may be reapplied to the absorption of a further quantity of carbon dioxide-containing gas. These cycles may be repeated many times before the concentration of degradation products builds up to the point where the solution must be discarded, or the degradation products removed by filtration.

The foregoing procedures, of course, readily are adaptable to continuous operation wherein the treating solution is continuously withdrawn from the column, regenerated, and recycled to the column; and wherein make-up blood catalyst is added from time to time as required.

The catalysts of the invention and the manner of their production and use are illustrated in the following examples.

*Example 1*

This example illustrates the preparation of the herein described blood catalyst by the alkaline hydrolysis of liquid blood.

231.6 grams of flaked sodium hydroxide was dissolved in 20 pounds of water and the mixture heated to 200° F. 20 pounds of liquid beef blood (20% solids) then was added slowly to the hot caustic solution, maintaining the temperature above 190° F.

After all of the blood had been added, the temperature was raised to 212° F., just below the boiling point, and the stirring continued for 35 minutes. This completed the hydrolytic reaction.

*Example 2*

This example illustrates the production of the herein described catalyst by the alkaline hydrolysis of declotted, defibrinated liquid beef blood.

231.6 grams of flake caustic were dissolved in 1 lb. of water and the resulting solution mixed with 20 pounds of liquid beef blood that had been declotted and defibrinated. The resulting mixture was stirred vigorously until a gel developed.

The gel was maintained at 130° F. for 3 hours, at the end of which time it had thinned down sufficiently to be stirrable.

Next, the temperature was raised to 210° F. and the heating continued for 25 minutes to produce the catalytic product.

*Example 3*

This example illustrates the production of the blood catalyst by the acid hydrolysis of blood.

202 ml. of concentrated sulfuric acid (98% $H_2SO_4$) was dissolved in 25 pounds of water and the solution heated to 210° F. 15 pounds of declotted and defibrinated liquid blood was added slowly to the mixture so that the temperature did not fall below 190° F. The heating and stirring was continued for 45 minutes to give the hydrolyzed product.

Example 4

This example illustrates the production of the presently described blood catalyst by the enzymatic hydrolysis of blood.

7.5 grams of proteolytic fungal enzyme ("Rhozyme W-15") was dissolved in 200 ml. of distilled water and then thoroughly mixed with 10 pounds of defibrinated declotted liquid blood. 18.15 grams of sodium dichromate preservative dissolved in 200 ml. of distilled water was mixed in.

The enzyme mixture then was stirred at room temperature for 34 hours after which it was spray dried to form a solid catalytic product.

In a manner similar to the foregoing, catalyst blood products were produced using as enzymes feed grade pepsin, fungal proteolytic enzymes, ficin concentrate, protease concentrate, HT proteolytic concentrate, pancreatin concentrate, papain concentrate, trypsin concentrate, and bromelin.

Example 5

This example illustrates the critical degree of alkaline blood hydrolysis necessary for the production of the herein described blood catalyst.

560 grams of water were placed in a 5 liter, 3-necked reaction flask and heated to 200° F. 40 grams of flaked caustic soda were added. 400 grams of spray dried soluble blood (65% beef, 35% hog) were dissolved in 3000 ml. of water and the resulting blood solution added to the hot caustic soda solution slowly so that the temperature did not drop below 190° F.

As soon as all the blood had been added, the first 25 ml. hydrolysis sample was taken for analysis of its carboxyl content. Subsequently, additional samples were taken at a sequence of time intervals. All of the samples were cooled immediately in an ice bath to 50° F.

The carboxyl content of each sample was determined by a modification of the standard formal titration set forth in Hawk, Oser and Summerson, "Practical Physiological Chemistry, 13th edition, McGraw-Hill, 1954, page 130.

Each of the samples of known carboxyl content then was used as a catalyst in the absorption of carbon dioxide gas. The procedure employed was as follows:

22 ml. of each sample was dissolved in 3 pounds of 1 N sodium carbonate solution and placed in an absorption column. This provided 3% by weight of blood catalyst, based on the weight of the sodium carbonate.

Carbon dioxide gas was bubbled through the sample for 3 minutes, after which it was titrated with silver nitrate for bicarbonate ion, thus giving a measure of percent conversion, carbonate to bicarbonate. This in turn gave a measure of the catalytic efficiency of the hydrolyzed blood.

The results of these tests are given in Table I below:

TABLE I

| Sample No. | Mg. Titratable Carboxyl per gm. Blood | Percent Conversion $Na_2CO_3$-$NaHCO_3$ |
| --- | --- | --- |
| Blank | | 17.0 |
| Blood | 16.9 | 22.7 |
| 1 | 18.4 | 26.1 |
| 2 | 19.6 | 29.2 |
| 3 | 20.1 | 33.4 |
| 4 | 20.7 | 34.1 |
| 5 | 21.4 | 35.6 |
| 6 | 22.0 | 36.1 |
| 7 | 22.9 | 36.12 |
| 8 | 29.5 | 36.12 |
| 9 | 30.3 | 36.10 |
| 10 | 34.2 | 32.00 |
| 11 | 40.7 | 17.21 |
| 12 | 44.2 | 17.20 |
| 13 | 45.6 | 17.20 |

In a separate determination it was found that unhydrolyzed pure beef blood had a titratable carboxyl content of 17.9 mg. and unhydrolyzed pure hog blood had a titratable carboxyl content of 16.2 mg., per gram of blood.

The data of Table I are plotted in FIG. 10. It will be observed from this figure, that the conversion of sodium carbonate to sodium bicarbonate is improved significantly by the use of a blood catalyst having a titratable carboxyl content of from about 20 to about 40 mg. per gram.

Example 6

This example illustrates the critical degree of acid blood hydrolysis necessary for the production of the herein described blood catalyst.

500 ml. of water was placed in a 5 liter, 3-necked reaction flask. 100 grams of concentrated sulfuric acid was added slowly. The solution then was heated to 200° F.

400 grams of a spray-dried soluble blood mixture containing approximately 65% beef blood and 35% hog blood was dissolved in 3000 grams of hot water, slowly so that the temperature did not fall below 190° F. While maintaining the temperature at that level, samples were taken at periodic intervals and titrated for carboxyl content.

For this purpose a modification of the formal titration described in Example 5 was employed. The titration was carried out by adding 10 ml. of the hydrolyzed blood solution to 41 ml. of distilled water. The pH was adjusted to 7.0 with 0.1 N NaOH or 0.1 N HCl. 1 ml. of neutralized reagent grade 37.1% formaldehyde was added. The pH again was adjusted to 7.0. The solution was titrated with 0.1 N NaOH from a pH of 7.0 to 9.0.

A blank was run to determine the buffering effect of the salts in the solution. This was done by lowering the pH of tap water to that of the blood hydrolysis solution, then adjusting the pH to 7.0 with 0.1 N NaOH and titrating with 0.1 N NaOH from pH 7.0 to pH 9.0. The value thus obtained was subtracted from the sample titration figures.

In addition the carboxyl content of unhydrolyzed blood was determined by titrating a 10 ml. sample of a 10% blood solution by the procedure outlined above.

The various samples whose carboxyl content had been determined as outlined above then were used separately as catalysts in the absorption of carbon dioxide gas, using the procedure set forth in Example 5. The results are given in Table II and in FIG. 10.

TABLE II

| Sample No. | Mg. Titratable Carboxyl per gm. Blood | Percent Conversion, $Na_2CO_3$-$NaHCO_3$ |
| --- | --- | --- |
| Blank | | 16.8 |
| Blood | 18.40 | 22.1 |
| 1 | 19.40 | 25.4 |
| 2 | 21.20 | 27.8 |
| 3 | 22.30 | 29.81 |
| 4 | 23.60 | 32.60 |
| 5 | 24.51 | 34.80 |
| 6 | 25.70 | 34.70 |
| 7 | 33.90 | 34.80 |
| 8 | 38.60 | 29.20 |
| 9 | 45.70 | 17.80 |

Again it will be observed that the conversion of sodium carbonate to sodium bicarbonate is improved significantly by the use of blood catalyst having a titratable carboxyl content of from about 20 to about 40 milligrams per gram.

Example 7

This example illustrates the critical degree of enzymatic blood hydrolysis necessary for the production of the herein described blood catalyst.

600 grams of water was placed in a 5 liter 3-necked flask. 8.0 grams concentrated food grade proteolytic enzyme ("Rhozyme W-15") was added and stirred for 15 minutes. 400 grams of spray dried soluble blood (65% beef, 35% hog) was dissolved in 3000 milliliters of tap water.

The blood solution was added to the enzyme solution. The temperature of the resulting mixture was maintained at 95° F. with constant stirring.

At various time intervals 10.0 ml. samples were taken from the flask and titrated, using the modified formal titration described in Example 5.

This consisted of adding 41.0 ml. of distilled water to the hydrolyzed blood sample, adjusting the pH to 7.5 with 0.1 N HCl or 0.1 N NaOH, adding 1.0 ml. of 37.1% neutral formaldehyde solution, adjusting the pH to 7.0 and then slowly titrating the solution to a pH of 9.0 with 0.1 N NaOH.

A blank was run using distilled water to determine the amount of 0.1 N NaOH needed to adjust the pH from 7.0 to 9.0. This was subtracted from the sample titration figures.

The carboxyl content of the unhydrolyzed blood was determined by titrating 10 ml. sample of a 10% solution by the foregoing procedure.

The values obtained are given in Table III and also in the graph of FIG. 10.

TABLE III

| Sample No. | Mg. Titratable Carboxyl per gm. Blood | Percent Conversion, $Na_2CO_3$-$NaHCO_3$ |
|---|---|---|
| Blank | | 17.5 |
| Blood | 17.1 | 22.1 |
| 1 | 17.7 | 24.7 |
| 2 | 18.3 | 27.1 |
| 3 | 19.6 | 32.4 |
| 4 | 21.4 | 37.7 |
| 5 | 23.5 | 38.1 |
| 6 | 25.0 | 38.1 |
| 7 | 28.1 | 38.1 |
| 8 | 37.6 | 28.0 |
| 9 | 42.5 | 19.1 |

It will be observed from the data of Table III and also from the graph that the conversion of sodium carbonate to sodium bicarbonate is improved significantly by the use of a blood catalyst having a titratable carboxyl content of from about 20 to 40 mg. per gram.

Example 8

This example illustrates the inoperativeness as a carbon dioxide absorption catalyst of individual amino acids per se.

The carbon dioxide absorption procedure of Example 5 was repeated.

Three typical amino acids of known carboxyl content were applied individually as catalysts to the conversion of sodium carbonate to sodium bicarbonate in the manner described. The acids employed were:

Alanine
Leucine
Glycine

The results are set forth in Table IV and in FIG. 11.

TABLE IV

| Test material: | Percent conversion $Na_2CO_3$ to $NaHCO_3$ |
|---|---|
| Blank | 17.0 |
| Alanine | 17.4 |
| Leucine | 18.2 |
| Glycine | 18.9 |

From Table IV and the graph, it will be observed that the increase in catalytic efficiency noted above is obtained when the blood is hydrolyzed to a carboxyl content of from about 20 to about 40 mg. per gram. In addition, it will be observed that individual amino acids per se demonstrate no catalytic effect.

Example 9

This example illustrates the application of the presently described blood catalyst to the absorption of pure carbon dioxide in caustic soda solution.

A 1½ inch internal diameter vertical column 24 inches high, packed with Raschig rings to a depth of 20 inches, was provided with means for counter current circulation of aqueous sodium hydroxide solution and carbon dioxide gas, the former being circulated downwardly and the latter upwardly.

The liquor concentration was 6.25% by weight caustic soda. The gas and liquor rates were purposely selected to produce a relatively inefficient column operation, the gas rate being 0.702 pound per hour and the liquor rate 3.375 gallons per hour.

Several runs were made, incorporating in the liquor from 0–9% by weight, dry catalyst on the caustic soda basis, of blood catalyst prepared by the alkaline hydrolysis of beef blood according to the method described in Example 1.

The results are given in FIG. 1, from a consideration of which it will be noticed that when no blood catalyst was used, a 54% conversion of sodium hydroxide to sodium carbonate was achieved. However, the inclusion of even very small amounts of blood catalyst in the liquor markedly increased the conversion, a maximum conversion of about 81% being achieved when about 3% of catalyst was employed. Increasing the amount of catalyst beyond this amount was ineffective in increasing the conversion.

Example 10

This example illustrates the application of the herein described blood catalyst to the absorption of carbon dioxide in aqueous sodium carbonate.

Figure 2:
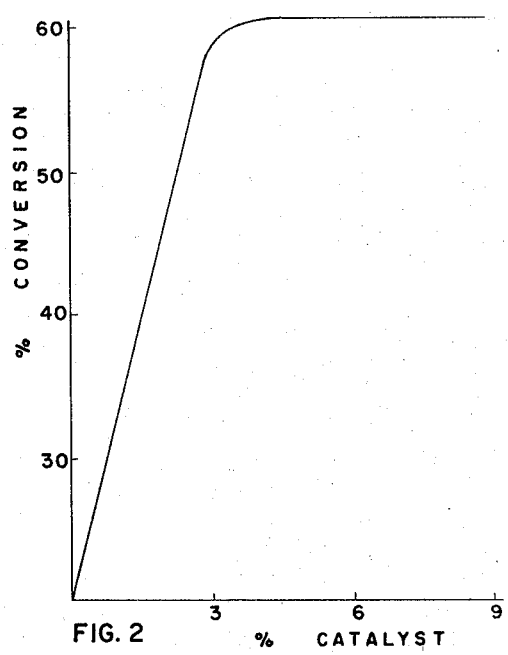
Figure 3:
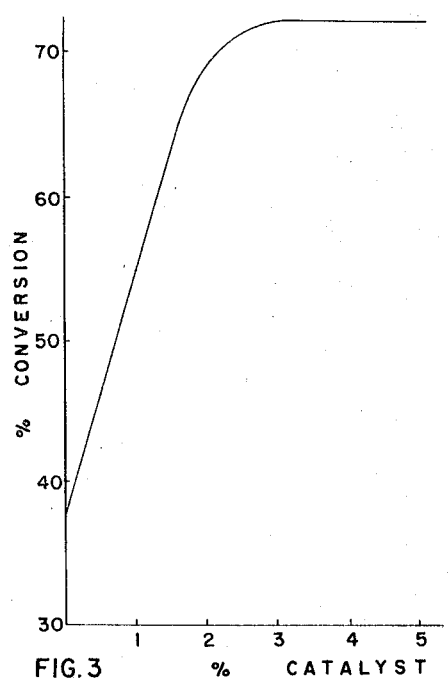
Figure 4:
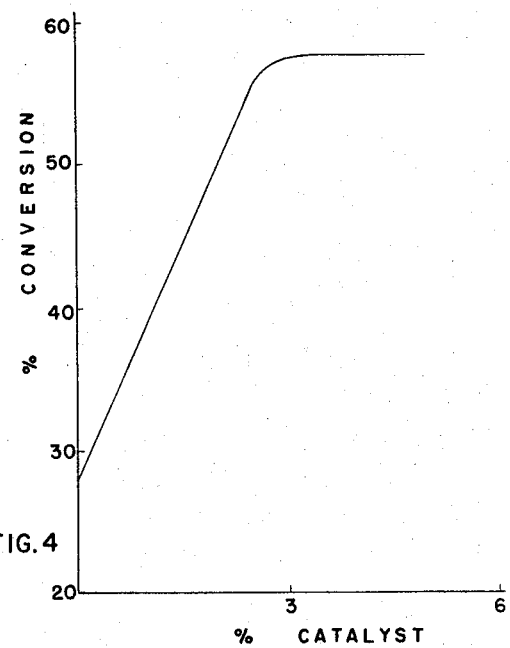

The procedure of Example 9 was followed, except that a 6.25% by weight solution of sodium carbonate was used as the absorbent solution. The results are indicated in FIG. 2.

It will be noted that the conversion of sodium carbonate to sodium bicarbonate in the absence of catalyst was 21%. However, in the presence of 3% of the blood catalyst the conversion was increased to 60%. Increasing the proportion of catalyst beyond this amount employed did not increase the conversion correspondingly.

Example 11

This example illustrates the application of the presently described process to the absorption of carbon dioxide from the atmosphere.

The procedure of Example 9 was followed except that an absorption column 42 inches high, having an internal diameter of 3½ inches, and packed with Intalox saddles, was used. The liquor employed was a 4.0% by weight aqueous solution of sodium hydroxide and the gas was atmospheric air, having a 0.03% by weight content of carbon dioxide. The liquor rate was 5.57 gallons per hour and the gas rate 3.0 pounds per hour.

Two runs were made, one without any catalyst being present in the caustic soda solution; the other with 3.0% of alkali-hydrolyzed blood catalyst prepared as in Example 1.

A 60% increase in the amount of carbon dioxide absorbed in the caustic soda solution was observed in the run in which the catalyst was employed.

Example 12

This example indicates the efficiency of the presently described absorption catalyst when applied to the absorption of carbon dioxide from gaseous mixtures containing different amounts of carbon dioxide.

The procedure of Example 9 was followed except that the absorption column described in Example 11 was used. Sodium carbonate was used as the liquor and gaseous feeds containing 100%, 14% and 2% carbon dioxide, respectively. In each case the liquor concentration was 5.3% sodium carbonate. The liquor circulation rates were 29.90, 5.57 and 5.57 gallons per hour respectively. The gas circulation rates were 1.38, 1.4 and 1.735 pounds per hour, respectively.

Several runs were made using each set of conditions but using amounts of blood catalyst of Example 1 ranging from 0–5% by weight. The results are given in FIGS. 3, 4 and 5.

It will be observed from these figures that when the gas stream contained 100%, 14% and 2%, respectively, of carbon dioxide gas, the maximum amounts by which the absorption of the carbon dioxide was increased, was 92%, 105% and 123%, respectively.

Also, in each case, maximum catalytic benefit was obtained at a level of about 3% catalyst use.

*Example 13*

This example illustrates the application of the presently described hydrolyzed blood catalyst to the absorption of carbon dioxide in aqueous potassium carbonate.

The procedure described in Example 10 was repeated using 3 different gas concentrations, i.e., 100% carbon dioxide, 14% carbon dioxide, and 0.03% carbon dioxide (air). The liquor concentration in each case was 7.0% potassium carbonate.

When the gas stream was 100% carbon dioxide, the liquor rate was 29.9 gallons per hour, and the gas rate 1.38 pounds $CO_2$ per hour.

When the gas concentration was 14% $CO_2$, the liquor rate was 5.57 gallons per hour, and the gas rate 1.4 pounds per hour.

When the gas concentration was 0.03% $CO_2$, the liquor rate was 21.0 gallons per hour and the gas rate 3.0 pounds per hour.

Figure 6:
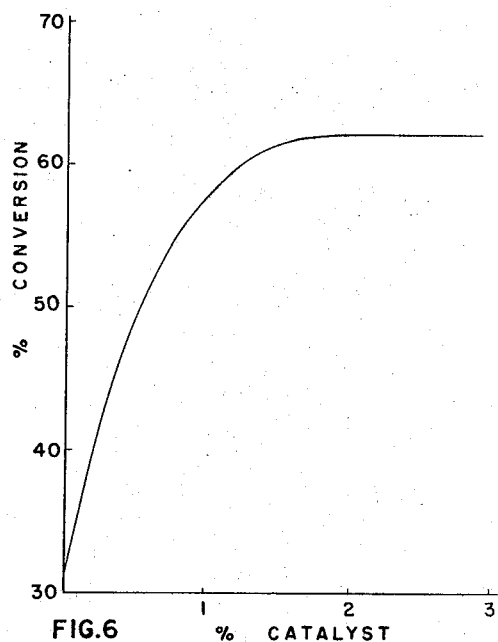
Figure 8:
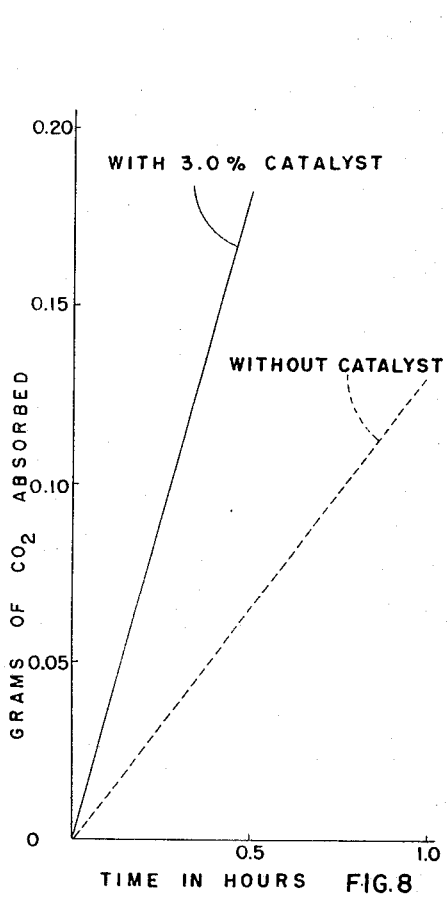
Figure 7:
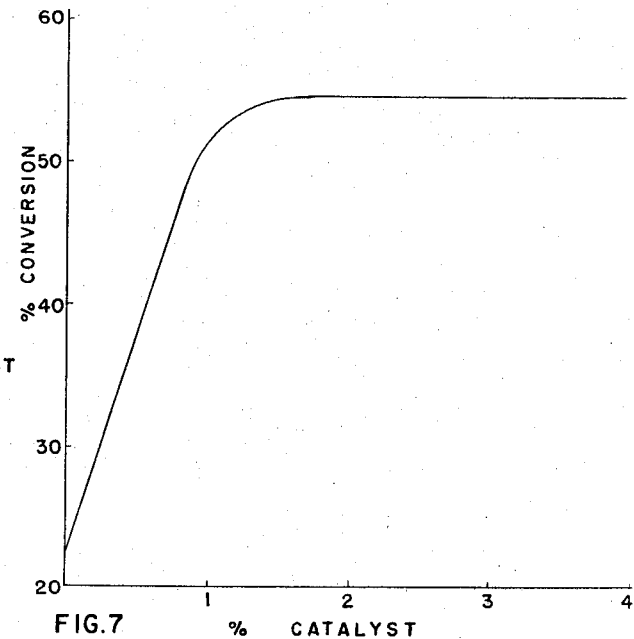

The results of these runs are given in FIGS. 6, 7 and 8, respectively. All of them illustrate that the hydrolyzed blood catalyst is effective in catalyzing the absorption of carbon dioxide into potassium carbonate no matter what the concentration of carbon dioxide in the free gas.

Thus where the carbon dioxide concentration is 100%, a 94% increase in the amount of absorbed carbon dioxide is obtained when the blood catalyst is employed. When the carbon dioxide content is 14%, the increase is 140%. Where the concentration is 0.03%, the catalyzed potassium carbonate solution absorbed 38% more carbon dioxide in one-half hour time than the uncatalyzed solution absorbed in one hour.

Furthermore, as shown by FIGS. 6 and 7, the maximum efficiency of the catalyst is attained at a catalyst use of 1½% by weight, dry potassium carbonate basis.

*Example 14*

This example tests the effect of the catalyst on the regeneration rate of a sodium carbonate solution converted to sodium bicarbonate by reaction with carbon dioxide.

In batch operation, 16.8% by weight aqueous sodium bicarbonate solutions such as are generated by absorption of carbon dioxide into aqueous sodium carbonate, were converted to sodium carbonate solutions by simple boiling, the heat requirement being noted at various stages of the regeneration.

Two runs were made, one without the inclusion of hydrolyzed blood catalyst and the other with the inclusion of 1.2% of such a catalyst, prepared as in Example 1.

The results are given in FIG. 9. It will be seen that the regeneration rate of sodium carbonate from sodium bicarbonate is either unaffected, or slightly better, in the hydrolyzed-blood-catalyzed solution.

The regenerated sodium carbonate solution containing the blood catalyst then was used again for the absorption of a further quantity of carbon dioxide after which it again was regenerated.

*Example 15*

This example illustrates the application of the herein described hydrolyzed blood catalyst in the absorption of carbon dioxide into aqueous alkaline solutions at elevated temperatures.

6.42 pounds of sodium carbonate was dissolved in 33.6 pounds of water and the resulting solution placed in a steam jacketed cooker. 87.6 grams alkali-hydrolyzed blood catalyst was added and the mixture heated to 273° F. (30 p.s.i.). At various intervals of time 3.0 pound samples of solution were withdrawn, cooled to 70° F. and applied to the absorption of carbon dioxide in a packed column using the following conditions:

| | |
|---|---|
| Liquor rate, gallons per minute | 0.243 |
| Gas rate, $CO_2$ pounds per hour | 0.3 |
| Gas rate, air pounds per hour | 1.7 |
| Duration of run, minutes | 15 |

The sodium carbonate solutions then were titrated to determine bicarbonation, with results as follows:

| Length of heating in hours: | Percent conversion |
|---|---|
| 0 | 30.0 |
| 5 | 36.0 |
| 14 | 37.0 |
| 19 | 36.0 |
| 23 | 30.0 |
| 31 | 31.0 |
| 39 | 30.0 |
| 45 | 27.0 |
| 52 | 17.1 |
| 60 | 15.2 |

These results demonstrate that the presently described hydrolyzed blood catalyst will retain its effective life for 45 hours or more, even when maintained at 273° F. in a 16% sodium carbonate solution.

Having thus described our invention in preferred embodiments, we claim as new and desire to protect by Letters Patent:

1. The process of absorbing carbon dioxide gas into aqueous alkaline solutions which comprises:
   (a) providing an aqueous solution of an inorganic alkali material, the solution having a pH of at least 9,
   (b) dispersing in the solution from 0.25 to 10.0% by weight, based on the weight of the alkali material, of hydrolyzed animal blood catalyst having a carboxyl content of from about 20 to about 40 mg. titratable carboxyl per gram of hydrolyzed blood,
   (c) and contacting carbon dioxide gas with the hydrolyzed blood-containing alkaline solution, thereby forming a water soluble alkaline salt of carbonic acid.

2. The process of claim 1 wherein the aqueous solution is a caustic soda solution.

3. The process of claim 1 wherein the aqueous solution is a sodium carbonate solution.

4. The process of claim 1 wherein the aqueous solution is a potassium carbonate solution.

5. The process of claim 1 wherein the hydrolyzed animal blood catalyst is an alkali-hydrolyzed animal blood catalyst.

6. The process of claim 1 wherein the hydrolyzed animal blood catalyst is an acid-hydrolyzed animal blood catalyst.

7. The process of claim 1 wherein the hydrolyzed animal blood catalyst is an enzyme-hydrolyzed animal blood catalyst.

8. The process of separating carbon dioxide gas from other gaseous atmospheric constituents which comprises:
   (a) providing an aqueous solution of potassium carbonate having a pH of at least 9.0 and a potassium carbonate content of .1 to 40% by weight, (b) dissolving in the solution from 0.25 to 10.0% by weight, based on the weight of the potassium carbonate, of a hydrolyzed animal blood catalyst having a carboxyl content of from about 20 to 40 mg. per gram of hydrolyzed blood, (c) passing a carbon dioxide-containing gas stream through the solution, thereby converting its carbon dioxide content to potassium bicarbonate, (d) and after substantial conversion of the potassium carbonate to potassium bicarbonate, heating the solution for driving off the absorbed carbon dioxide and regenerating its content of potassium carbonate.

References Cited by the Examiner

UNITED STATES PATENTS 2,456,297  12/1948  Melnick _____ 260—529 X
2,993,750  7/1961  Giammarco _____ 23—2

OTHER REFERENCES

Fox et al.: "Introduction to Protein Chemistry," John Wiley and Sons, Inc., New York, 1957, pp. 75–77 and 327–331.

OSCAR R. VERTIZ, *Primary Examiner.*

EARL C. THOMAS, *Examiner.*